Oct. 9, 1962 K. REUSCHEL ET AL 3,057,690
METHOD FOR PRODUCING HYPERPURE SILICON
Filed Nov. 18, 1959
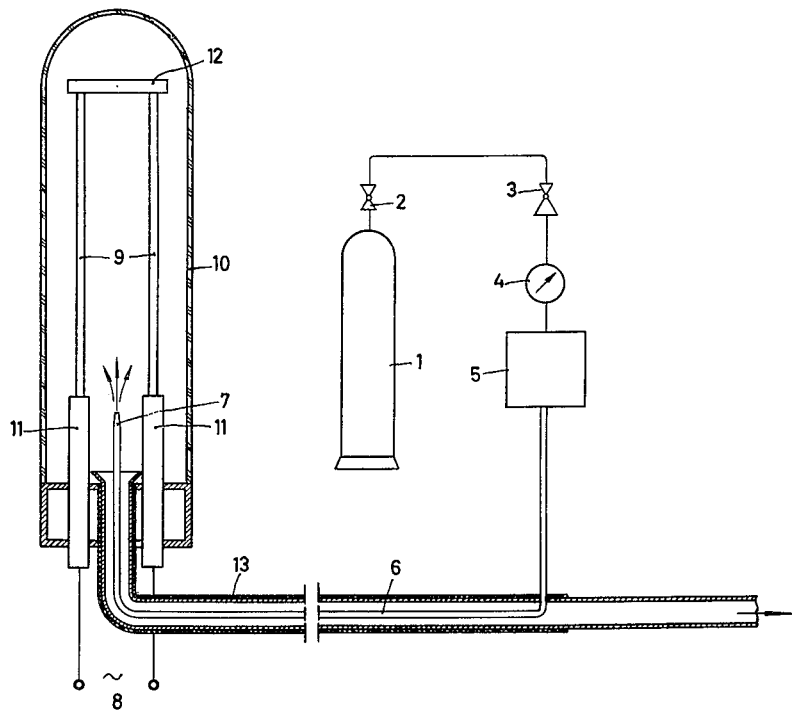

3,057,690
METHOD FOR PRODUCING HYPERPURE SILICON
Konrad Reuschel and Arno Kersting, Pretzfeld, Upper Franconia, Germany, assignors to Siemens-Schuckerwerke Aktiengesellschaft, Berlin-Siemensstadt, Germany, a corporation of Germany
Filed Nov. 18, 1959, Ser. No. 853,886
Claims priority, application Germany Dec. 9, 1958
2 Claims. (Cl. 23—223.5)

Our invention relates to a method for producing hyperpure silicon suitable as semiconducting material for transistors, rectifiers, and other electric semiconductor devices. In a more particular aspect, our invention is an improvement over the method described in the patent application of H. Gutsche, Serial No. 737,254, filed May 23, 1958, and assigned to the same assignee, which method comprises precipitating the silicon upon silicon-carrier rods by chemical conversion from a gaseous compound such as halogenide, with the aid of a carrier gas such as hydrogen acting as reducing agent within an at least partially transparent reaction vessel of glass or quartz whose temperature, during precipitation of the silicon, is maintained between the approximate limits of 300° C. and 800° C.

To obtain silicon by precipitating it from the gaseous phase onto a glowing silicon carrier in the presence of hydrogen, there has often been used a water cooled reaction vessel which is relatively narrow, partly to minimize the space requirements and partly to secure a given flow velocity of the reaction mixture. When a vessel of this kind is employed, silicon halogenides of higher molecular constitution precipitate in the form of an oil on the cold wall of the vessel. This oil runs downward along the wall and is lost, or not available, to the process. This entails a reduction in yield because the oily precipitate contains, on the average, about 25% silicon. Furthermore, the oil is vigorously aggressive, chemically, and is self-ignitable in air, so that the servicing of the equipment is not free of hazard, particularly when removing the completed silicon rods and when cleaning the vessel.

If water cooling is not applied to the outside of the vessel there is formed on the inner side of the relatively narrow vessel, at very high wall temperatures in the range of 1000° C., a silicon precipitate in solid form, having the appearance of a mirror-like coating. This renders the vessel wall opaque and makes it impossible to visually observe the course of the process. A similar silicon coating is also formed when a vessel of greater width is used, because the wall temperature remains below 300° C.

The formation of the above-mentioned coating is avoided if the process is conducted while maintaining the vessel wall at a temperature between about 300° C. and about 800° C. With a given processing equipment, the temperature of the vessel wall increases with increasing duration of the process. This is due to the fact that as the thickness of the silicon body being produced increases, the maintenance of the most favorable processing temperature, which is approximately 1100° C., requires an increasing supply of heating power through the carrier rod. Consequently, as a result of the gradually increasing surface area of the glowing silicon body, a gradually increasing amount of heat is radiated off toward the vessel wall. It may therefore happen that, during the course of the process, the vessel wall temperature increases from an initial value considerably below 300° C. to a much higher value. It has been observed, accordingly, that, during a first partial period of processing, the vessel wall became coated and opaque, whereas in the further processing period this coating again vanished and the vessel then remained clear and transparent up to the termination of the process. The lack of observability, however, is particularly objectionable during the first period or stage of the process because the danger of the carrier rods melting through remains relatively great so long as the rods are still thin. This danger is lessened as the rods become thicker, because the thicker rods have a correspondingly increased heat capacity.

This difficulty is eliminated if the temperature of the reaction vessel is already raised to at least 300° C., in the first stage of the process, and is thereafter kept constant, or at least approximately so, during the entire process.

It has been found, particularly when operating with large gas throughputs, that the wall of the cylindrical vessel may sometimes become cooled below the required minimum temperature.

It is an object of our invention to eliminate such deficiencies and to render the method more reliable.

For this purpose, and in accordance with a feature of our invention, we supply the reaction gas mixture to the processing vessel in pre-heated condition before it enters into the reaction vessel.

It is, of course, necessary that the pre-heating of the reaction gas be kept within such limits that the upper temperature of 800° C., of the above-mentioned temperature range of the silicon-precipitating process, is not substantially exceeded.

According to another feature of our invention, the hot residual gases issuing from the reaction vessel are utilized by means of a heat exchanger for the pre-heating of the reaction gas mixture being supplied to the vessel. The pre-heating is preferably carried out in a simple manner by having the inlet pipe for feeding the reaction gas mixture into the vessel extend over a sufficient length through the exit pipe for the hot residual gases issuing from the processing chamber in the vessel. For improved heat transfer, the reaction-gas supply pipe is preferably made of a good heat-conducting material, for example silver or copper. The gas exit pipe for the residual gases is preferably insulated on the outside to minimize loss by heat radiation.

Another way of pre-heating the reaction gas mixture for the purposes of the invention is to heat the gas supply pipe ahead of the reaction vessel electrically over a sufficient length, or to pass the supply pipe through a furnace.

The invention will be further elucidated with reference to the drawing showing schematically, and partly in section, an apparatus for performing the novel method.

Hydrogen, to act as a reducing carrier gas, is taken from a gas flask 1 through a shut-off valve 2 and a plural-stage pressure-reducing valve 3 and passes through a gas-quantity meter 4 into the gas evaporator 5 where the hydrogen is mixed with the evaporation reaction gas, such as silicon tetrachloride or silicon hydrogen chloride. The mixture passes through a gas-supply pipe 6 and through a nozzle 7 into the processing space, the nozzle 7 producing a turbulent flow. The gas mixture passes along to carrier rods 9 of silicon which are electrically connected in series and, during processing, are traversed by alternating current supplied from an alternating-current line to the terminals 8 for the purpose of heating the rods, preferably to about 1100° to 1200° C. The carrier rods 9 are firmly attached to coaxial holders 11 of graphite and are sealed from the ambient atmosphere by means of a quartz cylinder 10. The upper ends of the rods 9 are interconnected by a bridge piece 12 of silicon which forms a current-conducting connection between the rods. The spent residual gases leave the processing space through a heat-insulated outlet pipe 13 and flow along the gas inlet pipe in the direction opposed to that of the incoming gas mixture.

We claim:

1. In a method for producing hyperpure silicon in which the silicon is precipitated upon a hot carrier rod consisting of silicon, by chemical conversion from a gaseous compound with the aid of a carrier gas acting as a reducing agent, within an at least partially transparent reaction vessel at least partly comprised of a material taken from the group consisting of glass and quartz, the improvement characterized in that the temperature of the inner walls of which during precipitation is kept in the range of about 300° C. to 800° C., by pre-heating the gaseous compound and the carrier gas prior to entering into the reaction vessel, the said pre-heating being at a temperature such as to maintain the temperature of the inner walls of the reaction vessel in said range during the reaction, while the carrier rod is being heated to about 1100 to 1200° C. by passage of electric current lengthwise thereof, the reaction mixture of said gaseous compound and hydrogen gas being pre-heated by heat exchange with spent residual gases issuing from the reaction vessel.

2. In a method for producing hyperpure silicon in which the silicon is precipitated upon a hot carrier rod consisting of silicon, by chemical conversion from a gaseous compound with the aid of a carrier gas acting as a reducing agent, within an at least partially transparent reaction vessel at least partly comprised of a material taken from the group consisting of glass and quartz, the improvement characterized in that the temperature of the inner walls of said vessel during precipitation is kept in the range of about 300° C. to 800° C. by preheating the gaseous compound and the carrier gas prior to entering into the reaction vessel by means of the spent residual gases issuing from the reaction vessel, while the carrier rod is being electrically heated to a glowing temperature.

References Cited in the file of this patent

UNITED STATES PATENTS 2,441,603     Storks et al. _____ May 18, 1958

FOREIGN PATENTS 787,043     Great Britain _____ Nov. 27, 1957

OTHER REFERENCES

Bell Laboratories Record, vol. 33, 1955, pages 328–330.

Chemical Engineering, August 1957, pages 164–166.